United States Patent
Perry et al.

(10) Patent No.: US 8,050,815 B2
(45) Date of Patent: Nov. 1, 2011

(54) METHOD AND SYSTEM FOR SELECTIVELY MONITORING VEHICLE SYSTEMS AND FOR CONTROLLING VEHICLE SYSTEM PARAMETERS

(75) Inventors: Jeffrey W. Perry, Oxford, MI (US); Anne Ginn, Grosse Pointe, MI (US)

(73) Assignees: General Motors LLC, Detroit, MI (US); GM Global Technology Operations LLC, Detroit, MI (US)

( * ) Notice: Subject to any disclaimer, the term of this patent is extended or adjusted under 35 U.S.C. 154(b) by 1217 days.

(21) Appl. No.: 11/743,191

(22) Filed: May 2, 2007

(65) Prior Publication Data

US 2008/0275604 A1    Nov. 6, 2008

(51) Int. Cl.
*G01M 17/00* (2006.01)

(52) U.S. Cl. ...... 701/33; 701/49; 340/425.5; 340/426.1; 340/426.14; 340/426.18

(58) Field of Classification Search ............ 701/33, 701/49; 340/989, 426.1, 425.5, 426.18, 426.13, 340/426.14, 426.35, 426.36, 500, 1.1
See application file for complete search history.

(56) References Cited

U.S. PATENT DOCUMENTS

| | | | |
|---|---|---|---|
| 6,310,542 B1 * | 10/2001 | Gehlot | 340/426.25 |
| 6,429,773 B1 * | 8/2002 | Schuyler | 340/425.5 |
| 6,505,780 B1 | 1/2003 | Yassin et al. | |
| 6,741,920 B1 * | 5/2004 | Otto | 701/49 |
| 6,879,910 B2 * | 4/2005 | Shike et al. | 701/208 |
| 6,924,750 B2 * | 8/2005 | Flick | 340/989 |
| 6,925,368 B2 * | 8/2005 | Funkhouser et al. | 701/33 |
| 6,963,899 B1 | 11/2005 | Fernandez et al. | |
| 6,970,075 B2 | 11/2005 | Cherouny et al. | |
| 6,999,858 B2 * | 2/2006 | Walker et al. | 701/1 |
| 7,039,708 B1 | 5/2006 | Knobl et al. | |
| 7,135,967 B2 | 11/2006 | Culpepper et al. | |
| 7,138,914 B2 | 11/2006 | Culpepper et al. | |
| 7,155,321 B2 * | 12/2006 | Bromley et al. | 701/29 |
| 7,477,970 B2 * | 1/2009 | Bruelle-Drews | 701/36 |
| 7,561,950 B2 * | 7/2009 | Patenaude et al. | 701/36 |
| 2002/0008645 A1 * | 1/2002 | Flick et al. | 340/988 |
| 2003/0078709 A1 * | 4/2003 | Yester et al. | 701/36 |
| 2003/0144005 A1 | 7/2003 | Videtich | |
| 2003/0162523 A1 | 8/2003 | Kapolka et al. | |
| 2004/0010358 A1 | 1/2004 | Oesterling et al. | |
| 2004/0044454 A1 * | 3/2004 | Ross et al. | 701/33 |
| 2004/0138790 A1 * | 7/2004 | Kapolka et al. | 701/29 |
| 2004/0148354 A1 | 7/2004 | Saare et al. | |
| 2004/0158371 A1 * | 8/2004 | Iggulden et al. | 701/29 |
| 2004/0158373 A1 * | 8/2004 | Nakaya | 701/35 |
| 2005/0107928 A1 * | 5/2005 | Mueller | 701/33 |
| 2005/0225429 A1 * | 10/2005 | Burzio | 340/5.24 |
| 2005/0261815 A1 * | 11/2005 | Cowelchuk et al. | 701/36 |
| 2006/0001523 A1 * | 1/2006 | Underdahl et al. | 340/5.64 |
| 2006/0155439 A1 * | 7/2006 | Slawinski et al. | 701/35 |

(Continued)

*Primary Examiner* — John Nguyen
*Assistant Examiner* — Brian J Broadhead
(74) *Attorney, Agent, or Firm* — Dierker & Associates, P.C.

(57) ABSTRACT

A method for selectively monitoring one or more vehicle systems is disclosed. The method includes recognizing, at the vehicle, an activation device that is configured to trigger predetermined setting(s) for the one or more vehicle systems. The telematics unit transmits to a secure server a signal indicative of the fact that the activation device is in use. Access to the secure server for monitoring the one or more vehicle systems via an Internet-enabled program is selectively enabled. A system for monitoring one or more vehicle systems is also disclosed. Further, a method for controlling vehicle system parameters is disclosed herein.

17 Claims, 2 Drawing Sheets

U.S. PATENT DOCUMENTS

| | | |
|---|---|---|
| 2006/0166631 A1 | 7/2006 | Ross et al. |
| 2006/0173587 A1* | 8/2006 | Oesterling et al. ............... 701/2 |
| 2006/0258377 A1 | 11/2006 | Economos et al. |
| 2006/0293813 A1* | 12/2006 | Nou ............................. 701/33 |
| 2007/0027595 A1* | 2/2007 | Nou ............................. 701/36 |
| 2007/0200663 A1* | 8/2007 | White et al. ................. 340/5.31 |
| 2008/0223646 A1 | 9/2008 | White et al. |
| 2008/0269979 A1* | 10/2008 | Hermann et al. ............... 701/33 |
| 2008/0275604 A1* | 11/2008 | Perry et al. ..................... 701/33 |
| 2009/0207004 A1* | 8/2009 | Ziska et al. ................ 340/426.1 |

* cited by examiner

METHOD AND SYSTEM FOR SELECTIVELY MONITORING VEHICLE SYSTEMS AND FOR CONTROLLING VEHICLE SYSTEM PARAMETERS

TECHNICAL FIELD

The present disclosure relates generally to vehicle systems, and more particularly to a method and system for selectively monitoring one or more vehicle systems and for controlling vehicle system parameters.

BACKGROUND

Vehicle telematics units include components that enable hands free calling, vehicle tracking, transmission of navigational instructions, and other like features. Telematics units may also be configured to activate vehicle settings that are personal to the vehicle user. A user may select such settings and configure the telematics unit from within the vehicle or remotely from the vehicle (e.g., via an Internet-enabled program).

SUMMARY

An embodiment of a method for selectively monitoring one or more vehicle systems is disclosed herein and includes recognizing, at the vehicle, an activation device that is configured to trigger predetermined settings for the one or more vehicle systems. The telematics unit transmits to a secure server a signal indicative of the fact that the activation device is in use. Access to the secure server for monitoring the one or more vehicle systems via an Internet-enabled program is selectively enabled.

A method for controlling vehicle system parameters is also disclosed herein. An embodiment of the method includes selecting vehicle system parameter limitations; and configuring an activation device with the selected vehicle system parameter limitations. When the activation device is recognized by a vehicle, the vehicle system parameter limitations are activated within the vehicle.

BRIEF DESCRIPTION OF THE DRAWINGS

Features and advantages of embodiments of the present disclosure will become apparent by reference to the following detailed description and drawings, in which like reference numerals correspond to similar, though not necessarily identical, components. For the sake of brevity, reference numerals or features having a previously described function may not necessarily be described in connection with other drawings in which they appear.

DETAILED DESCRIPTION

Embodiment(s) of the system and method disclosed herein advantageously allow a user to monitor, at certain times, one or more vehicle systems by allowing him/her to access a secured server. Monitoring may advantageously be accomplished via an Internet-enabled program. Other embodiments of the system and method disclosed herein advantageously allow a user to select vehicle parameter limitations, and to configure a device to implement such limitations when the device is in use.

It is to be understood that, as used herein, the term "user" includes vehicle operators, passengers, and/or person(s) defining settings via, e.g., an Internet-enabled program. It is to be further understood that the term "vehicle owner" may be used interchangeably with subscriber/service subscriber.

The terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween). Additionally, two components may be permanently, semi-permanently, or releasably engaged with and/or connected to one another.

It is to be further understood that "communication" is to be construed to include all forms of communication, including direct communication and indirect communication. As such, indirect communication may include communication between two components with additional component(s) located therebetween.

Figure 1:
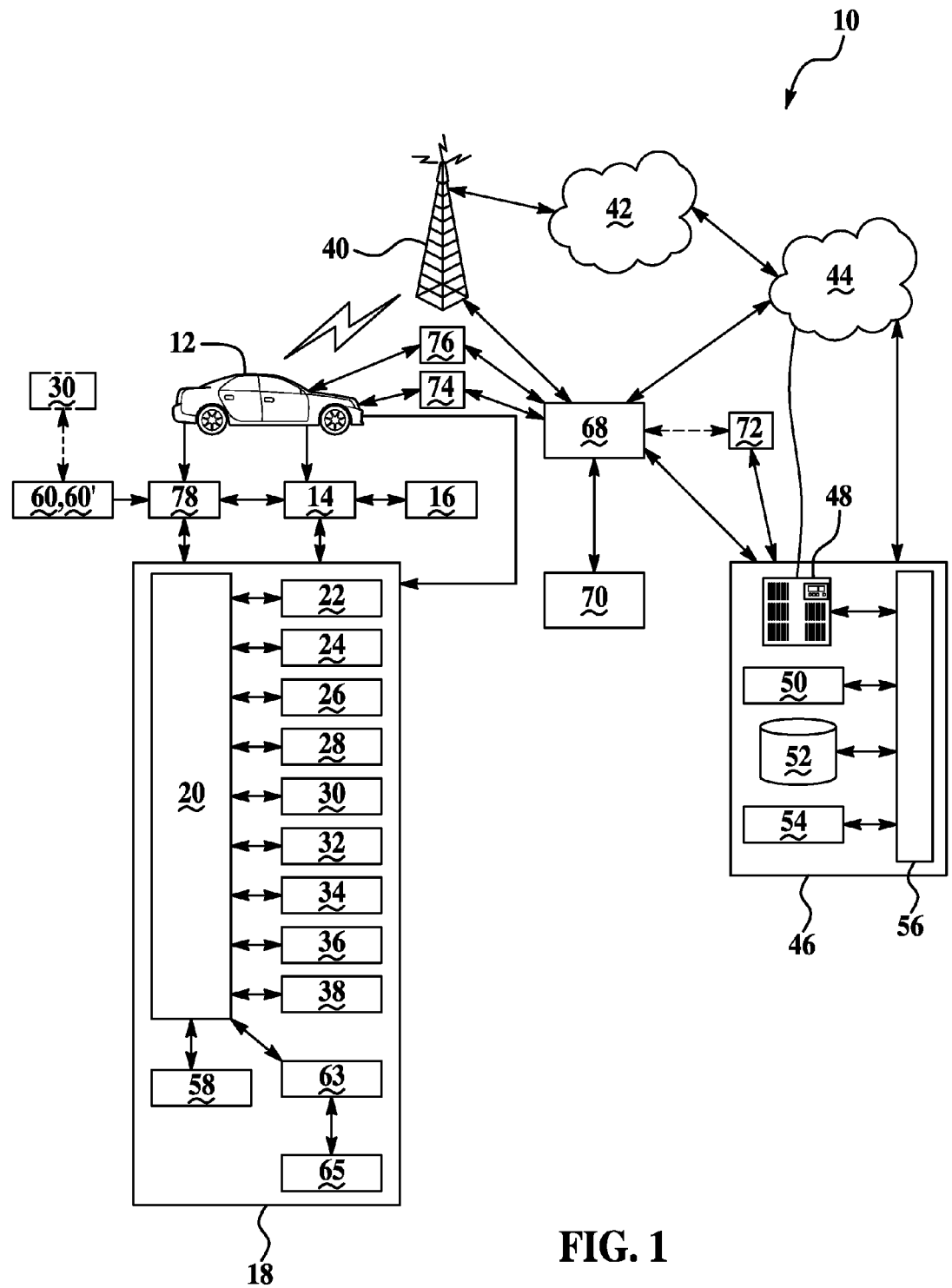
FIG. 1 is a schematic diagram depicting an embodiment of a system for selectively monitoring one or more vehicle systems.

Referring now to FIG. 1, the system 10 includes a vehicle 12, a vehicle communications network 14, a telematics unit 18, a control system 78, a wireless communication system (including, but not limited to, one or more wireless carrier systems 40, one or more communication networks 42, and one or more land networks 44), one or more Internet-enabled programs 68, and one or more call centers 46. In an embodiment, the wireless communication system is a two-way radio frequency communication system. In yet another embodiment, vehicle 12 is a mobile vehicle with suitable hardware and software for transmitting and receiving voice and data communications. System 10 may include additional components suitable for use in telematics units 18.

In an embodiment, via vehicle communications network 14, the vehicle 12 sends signals from the telematics unit 18 or the control system 78 to various units of equipment and systems 16 within the vehicle 12 to perform various functions, such as unlocking a door, executing personal comfort settings, and/or the like. In facilitating interaction among the various communications and electronic modules, vehicle communications network 14 utilizes interfaces such as controller area network (CAN), ISO standard 11989 for high speed applications, ISO standard 11519 for lower speed applications, and Society of Automotive Engineers (SAE) standard J1850 for high speed and lower speed applications.

The telematics unit 18 may send and receive radio transmissions from wireless carrier system 40. In an embodiment, wireless carrier system 40 may be a cellular telephone system and/or any other suitable system for transmitting signals between the vehicle 12 and communications network 42. Further, the wireless carrier system 40 may include a cellular communication transceiver, a satellite communications transceiver, a wireless computer network transceiver (a non-limiting example of which includes a Wide Area Network (WAN) transceiver), and/or combinations thereof.

Telematics unit 18 may include a processor 20 operatively coupled to a wireless modem 22, a location detection system 24 (a non-limiting example of which is a global positioning system (GPS)), an in-vehicle memory 26, a microphone 28, one or more speakers 30, an embedded or in-vehicle mobile phone 32, a real-time clock (RTC) 34, a short-range wireless communication network 36 (e.g. a Bluetooth® unit), a unique identifier 38, a user interface 63, and/or a user interface panel 65.

The telematics unit 18 may include additional components and functionality as desired for a particular end use. It is to be understood that the telematics unit 18 may also be implemented without one or more of the above listed components, such as, for example, speakers 30. Additionally, it is to be understood that the speaker(s) 30 may be a component of the vehicle audio entertainment system 60 (which includes a receiver 60').

In an embodiment, a user may communicate with the telematics unit 18 and/or with any equipment and system in operative communication therewith (e.g., control system 78) via the user interface panel 65. The user interface panel 65 is equipped with at least one input device such as, for example, a microphone, a button, a keyboard, a knob, a switch, and/or the like.

A user having a primary activation device 74 or a verified Internet-enabled program ID (referred to herein as a "primary user") may define (e.g., set, update, or remove), via the user interface panel 65 or via the Internet-enabled program 68 respectively, operating ranges for one or more vehicle systems. Very generally, this primary user (i.e., the user having the primary device 74 or the verified Internet-enabled program ID) requests via the user interface 63 or the Internet-enabled program 68 that certain settings be associated with the vehicle 12 when a particular activation device 74, 76 is in use. It is to be understood that the request is transmitted to the telematics unit 18, the control system 78, and/or the call center 46 from the interface 63 or the Internet-enabled program 68. The particular element 18, 78, 46 (or a secure server 72 in operative communication therewith) determines that the user is authorized to make such a request by recognizing the primary activation device 74 or by verifying inputted identification information, and adjusts the particular setting(s) per the request.

In an embodiment, the settings that are selected to be associated with the activation device 74, 76 are limitations on vehicle system parameters. It is to be understood that such system limitations are activated whenever the particular device 74, 76 is recognized by the vehicle 12. As such, one who selects the limitations may not be the user of the particular device 74, 76. The limitations for the settings may be selected via the user interface 63 or the Internet-enabled program 68, as previously described. Examples of the vehicle parameter limitations include, but are not limited to maximum vehicle speed, maximum audio system volume, restricted radio stations, restricted audio system functions, restricted telecommunications functions, defined geographic operating range, and combinations thereof. In some embodiments when the vehicle 12 activates such limitations, the user (having the programmed activation device 74, 76) is prohibited from exceeding the assigned limitations or from accessing restricted functions (e.g., certain radio stations, certain calling features, etc.). In other embodiments when the vehicle 12 activates such limitations, the user is warned when an action violates the set limitations.

A primary activation device 74 is generally a key or a key fob that may be issued to the vehicle owner upon purchase of the vehicle 12. The primary activation device 74 is configured such that, upon recognition of the device 74 by the vehicle 12 (e.g., via control system 78), the user of the device 74 has access to programs for setting the operating ranges.

It is to be understood that the primary user may request that particular setting(s) (e.g., limitations on vehicle systems) be linked to secondary activation devices 76. It is to be understood that the settings for the secondary activation device 76 may be selected with a particular secondary user (e.g., a teenager, a disabled user, etc.) in mind. Secondary activation devices 76 may also be keys or key fobs, however, when these devices 76 are recognized by the vehicle 12, programs for setting the operating ranges are not accessible. Furthermore, when the secondary activation device 76 is recognized by the vehicle 12, settings that have been associated with the device 76 are triggered in the vehicle 12.

As non-limiting examples, the secondary activation device 76 may be at least partially brightly colored and/or may be inscribed with a message indicating its nature. As non-limiting examples, the secondary activation device 76 may be labeled, for example, "TRACKING KEY," "BORROWER KEY," "TEEN KEY," "VALET KEY," and/or "See owner's manual for details."

Either of the activation devices 74, 76 may be detectable by the vehicle 12 upon insertion into the ignition, or via a wireless system that transmits a signal from the device 74, 76 to a receiver in the vehicle 12 when the activation device 74, 76 is located within a predetermined range of the receiver (e.g., via a radio frequency (RF) or infrared signal).

As used herein, "vehicle system" is to be interpreted broadly to include the hereinabove identified equipment and systems 16, the telematics unit 18, and/or other devices and systems operatively coupled to the processor 20 and/or the control system 78.

As briefly described hereinabove, operating ranges may be defined for one or more of the vehicle systems. The one or more operating ranges may be primary user-defined (e.g., input via user interface panel 65 or Internet-enabled program 68) or may be default (e.g., manufacturer-defined) settings. As non-limiting examples, definable operating ranges include a maximum vehicle speed, a maximum audio system volume, and/or a geographic vehicle operating range. Defined operating ranges may also restrict the use of one or more vehicle systems or settings. As non-limiting examples, a primary user may restrict access to one or more radio or satellite radio stations, audio system functions, and/or telecommunications functions (including voice/data communications). In an embodiment, a primary user may define an operating range to restrict access to a hands-free calling system and/or to restrict outgoing and/or incoming communications with third parties.

The previously mentioned control system 78 is in operative communication with one or more of the vehicle systems. In an embodiment, the control system 78 is the processor 20 of the telematics unit 18. In another embodiment, the control system 78 is distinct from the telematics unit 18 but is in operative communication therewith. The control system 78 directs the operation of the vehicle systems. As such, the control system 78 recognizes a particular activation device 74, 76, receives notice of any operating ranges associated therewith, and directs the operation of the vehicle systems in accordance therewith.

In accordance with the predefined settings associated with the respective activation device 74, 76, the control system 78 dictates periods of operation and/or non-operation for a vehicle system and/or of features/settings thereof. For example, if a maximum audio system volume has been defined for the secondary activation device 76, and a user utilizing the device 76 attempts to exceed the defined operating range, the control system 78 will direct the audio entertainment system 60 to not exceed the defined maximum volume. As another example, if a geographic vehicle operating range (i.e., a geographic area in which a user with the secondary activation device 76 is authorized to operate the vehicle 12) has been defined, the control system 78 does not prevent the vehicle 12 from leaving the geographic vehicle operating range, but, rather, notifies the vehicle owner (or other primary user) if the vehicle 12 has left the defined area. This may be accomplished, for example, by sending a text or email message/alert to the vehicle owner/primary user. When a user is outside a set geographic operating range, the control system 78 may disable certain vehicle convenience systems (e.g., radio) and play an alert message within the vehicle 12 to encourage the user to return within the specified operating range.

Referring more generally to the system 10, the vehicle audio entertainment system 60 is in operative and selective communication with the telematics unit 18 and the control system 78. The vehicle audio entertainment system 60 may be configured, in addition to accepting and outputting radio broadcasts, to accept and output audio and other signals. The vehicle audio entertainment system 60 may be adapted to output audio signals (i.e., an audio output) embodied in one or more of a variety of formats. For example, the audio entertainment system 60 may output audio signals from FM radio, AM radio, satellite radio, a compact disc (CD), a digital audio file (such as, for example, an .mp3 file or .wav file), a cassette tape, a minidisk, and/or a combination thereof.

Processor 20 and/or control system 78 may be a micro controller, a controller, a microprocessor, a host processor, and/or a vehicle communications processor. In another embodiment, processor 20 and/or control system 78 may be an application specific integrated circuit (ASIC). Alternatively, processor 20 and/or control system 78 may be a processor working in conjunction with a central processing unit (CPU) performing the function of a general-purpose processor.

The location detection system 24 is in operative communication with the secure server 72, is in selective communication with the Internet-enabled program 68, and may transmit notice of the vehicle location thereto. As discussed further hereinbelow in reference to FIG. 2, when the Internet-enabled program 68 is operatively connected and an authorized user is granted access, the vehicle location is transmitted from the Internet-enabled program 68 to the IEP interface 70. As such, in some embodiments, an authorized user may utilize the IEP interface 70 to monitor the vehicle's location. It is to be understood that the vehicle location is transmitted to the secure server 72, and, in some instances, to the Internet-enabled program 68 from the telematics unit 18.

Non-limiting examples of the location detection system 24 include a global positioning system receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown).

In-vehicle mobile phone 32 may be a cellular type phone, such as, for example an analog, digital, dual-mode, dual-band, multi-mode, and/or multi-band cellular phone.

Also associated with processor 20 is the previously mentioned real time clock (RTC) 34, which provides accurate date and time information to the telematics unit hardware and software components that may require date and time information. In one embodiment, date and time information may be requested from the RTC 34 by other telematics unit components. In other embodiments, the RTC 34 may provide date and time information periodically, such as, for example, every ten milliseconds.

Identifier 38 is unique to the secondary activation device 76 and is stored within the telematics unit 18. The identifier 38 is generally used in conjunction with an encrypted identifier (received from the secure server 72) to enable or deny outside access to the secure server 72. The identifier 38 allows the telematics unit 18 to determine whether the activation device 74, 76 in use is, in fact, a secondary activation device 76 that is recognized by the secure server 72 as a device 76 that can be monitored via an authorized party separate from a call center service advisor 54. The identifier 38 and the encrypted identifier will be discussed further hereinbelow.

Processor 20 and/or control system 78 may execute various computer programs that interact with operational modes of electronic and mechanical systems within the vehicle 12. It is to be understood that processor 20 controls communication (e.g., call signals) between telematics unit 18, wireless carrier system 40, call center 46, and Internet-enabled program 68.

Further, processor 20 and/or control system 78 may generate and accept digital signals transmitted between the telematics unit 18 and the vehicle communications network 14, which is connected to various electronic modules in the vehicle 12. In one embodiment, these digital signals activate the programming mode and operation modes within the electronic modules, as well as provide for data transfer between the electronic modules. In another embodiment, certain signals from processor 20 and/or control system 78 may be translated into vibrations and/or visual alarms.

It is to be understood that software 58 may be associated with processor 20 for monitoring and/or recording the incoming caller utterances.

The communications network 42 may include services from one or more mobile telephone switching offices and/or wireless networks. Communications network 42 connects wireless carrier system 40 to land network 44. Communications network 42 may be any suitable system or collection of systems for connecting the wireless carrier system 40 to the vehicle 12 and the land network 44.

The land network 44 connects the communications network 40 to the call center 46 and/or to the Internet-enabled program 68. In one embodiment, land network 44 is a public switched telephone network (PSTN). In another embodiment, land network 44 is an Internet Protocol (IP) network. In still other embodiments, land network 44 is a wired network, an optical network, a fiber network, another wireless network, and/or any combinations thereof. The land network 44 may be connected to one or more landline telephones. It is to be understood that the communications network 42 and the land network 44 connect the wireless carrier system 40 to the call center 46 and/or the Internet enabled program 68.

Call center 46 may contain one or more data switches 48, one or more communication services managers 50, one or more communication services databases 52 containing subscriber profile records and/or subscriber information, one or more communication services advisors 54 and one or more network systems 56.

It is to be understood that, although a service provider may be located at the call center 46, the call center 46 is a separate and distinct entity from the service provider. In an embodiment, the service provider is located remote from the call center 46. A service provider provides the user with telephone and/or Internet services. In an embodiment, the service provider is a wireless carrier (such as, for example, Verizon Wireless®, Cingular®, Sprint®, etc.). It is to be understood that the service provider may interact with the call center 46 to provide service(s) to the user.

Switch 48 of call center 46 may connect to land network 44 and to the secure server 72. Switch 48 may transmit voice or data transmissions from call center 46, and may receive voice or data transmissions from telematics unit 18 in vehicle 12 through wireless carrier system 40, communications network 42, and land network 44. As such, a connection between the telematics unit 18 and the call center 46 may be established via the wireless carrier system 40, communications network 42 and/or land network 44. Switch 48 may receive data transmissions from, or send data transmissions to, one or more communication service managers 50 via one or more network systems 56.

Call center 46 may contain one or more service advisors 54. In one embodiment, a service advisor 54 is human. In another embodiment, a service advisor 54 is an automaton. It is to be understood that the service advisor 54 may be located at the call center 46 or may be located remote from the call center 46 while communicating therethrough.

Communication may be accomplished via voice mode or data mode. Voice mode communications generally occur between the user and the service advisor 54 or some other third party. Data mode communications generally occur between one or more of the telematics unit 18, the Internet-enabled program 68, the secure server 72, and/or components of the call center 46 or service provider. In an embodiment, the communication is established via a connection extending (e.g., via the wireless communication system) between the telematics unit 18 and the call center 46.

In the embodiments disclosed herein, verbal communication (voice mode) may take place via microphone 28 coupled to the in-vehicle or mobile phone 32 associated with the telematics unit 18. In an embodiment, caller utterances into the microphone 28 are received at the call center 46, which may tokenize the utterance stream for further processing. In another embodiment, the tokenized utterances are placed in a subscriber information database 52 at the call center 46.

Communication between the telematics unit 18 user and a service advisor 54 (or between a telematics unit 18 and components of the call center 46) may be initiated automatically, or may be initiated by the user or the service advisor 54. In an embodiment, the user may initiate a call or a request, such as, for example, for telephone communication or a navigation communication, via an input system in communication with the telematics unit 18 and/or the two-way radio frequency communication system. Initiation of the communication may be verbal and/or via a physical motion. As such, the input system may include an alphanumeric keypad, a microphone 28, a menu selection system, and/or combinations thereof.

Internet-enabled program(s) 68 may also aid in sending and/or receiving data and communications. In an embodiment, the Internet-enabled program(s) 68 enable content delivery via packet data (i.e., over-the-air transmission control protocol/Internet protocol (TCP/IP)). In another embodiment, an Internet-enabled program 68 transmits signals and/or data via a short message service (SMS). In yet another embodiment, an Internet-enabled program 68 facilitates the transmission of voice communications via voice over Internet protocol (VoIP).

The Internet-enabled program(s) 68 are in operative communication with the Internet-enabled program (IEP) interface 70. The IEP interface 70 may be a computer (e.g., desktop, notebook, or handheld) or other device configured to access the Internet. In an embodiment, the IEP interface 70 includes or is in communication with an input device (e.g., a keyboard and/or mouse) and a display (e.g., a monitor and/or one or more speakers). The IEP interface 70 may communicate with Internet-enabled program 68 via a wired and/or wireless system.

The Internet-enabled program(s) 68 is/are also selectively operatively connected to the secure server 72, which is also operatively connected to the call center 46. Generally, access to the secure server 72 is limited to call center service advisors 54. However, at certain times (discussed further hereinbelow), the secure server 72 is accessible, via the Internet-enabled program 68, by a user that is outside the call center 46.

Figure 2:
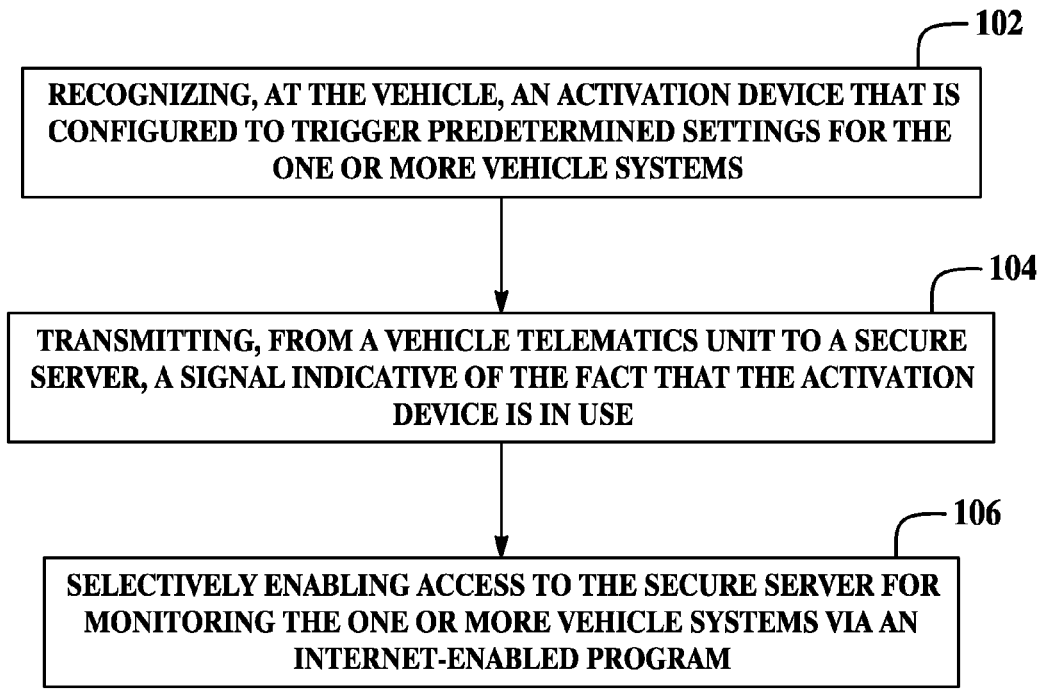
FIG. 2 is an embodiment of a method for selectively monitoring one or more vehicle systems.

Referring to FIG. 2, an embodiment of the method for selectively monitoring one or more vehicle systems includes: recognizing, at the vehicle 12, the activation device 74, 76 that is configured to trigger predetermined settings for the one or more vehicle systems, as shown at reference numeral 102; transmitting, from the vehicle telematics unit 18 to the secure server 72, a signal indicative of the fact that the activation device 74, 76 is in use, as shown at reference numeral 104; and selectively enabling access to the secure server 72 for monitoring the one or more vehicle systems via the Internet-enabled program 68, as shown at reference numeral 106.

More specifically, a primary user requests the settings (e.g., system limitations) for the device 74, 76 by accessing an account associated with the vehicle 12 via the interface 63 or the Internet-enabled program 68, as described hereinabove. In response, the telematics unit 18, control system 78 and/or call center 46 configure the device 74, 76 according to the requested settings. When the device 74, 76 is used to activate the vehicle 12, the control system 78 recognizes the device 74, 76 and the predetermined setting associated therewith. The control system 78 then transmits signals to the one or more vehicle systems and reconfigures the respective setting per the pre-set settings.

Upon detection of the activation device 74, 76, an audible, visual or tactile notice may be provided to the user via an in-vehicle notification system. In an embodiment, the notification system includes speaker(s) 30 and/or user interface panel 65. In another embodiment, the notification system provides tactile notice by, for example, vibrating the vehicle's seat and/or steering wheel. As a non-limiting example, the notice may (audibly and/or visually) output "You are using the TRACKING Key. This vehicle's location may be accessed and monitored via the Internet by authorized users, including the vehicle owner." It is to be understood that instead of "TRACKING Key," the activation device 74, 76 may be given any other suitable name.

In an embodiment, the notice indicates that one or more of the vehicle systems may be regulated and/or inaccessible to the vehicle 12 user. In another embodiment, no notice is given, or the notice indicates that one or more of the vehicle systems are not being regulated or monitored. If the user operating the vehicle 12 has a secondary activation device 76 associated with predetermined settings, the notification system may provide a notice if the user attempts to exceed any of the defined operating ranges. For example, if the user with the secondary activation device 76 attempts to exceed the maximum audio entertainment system 60 volume associated with the device 76, a notice may be provided to the user indicating that such a volume is restricted. As another example, if a user with the secondary activation device 76 drives the vehicle beyond the associated geographic vehicle operating range, the vehicle 12 is able to leave the operating range, but a notification may be sent to the vehicle owner (e.g., via text messaging, phone messaging, email messaging, to the like).

Upon recognition of the activation device 74, 76, the telematics unit 18 sends a signal to the secure server 72. The signal indicates to the server 72 that the activation device 74, 76 is in use in the vehicle 12. In response, the server sends an encrypted identifier to the telematics unit 18. The telematics unit 18 compares the received encrypted identifier with the unique identifier 38 stored therein. If the encrypted identifier matches the stored identifier 38, outside access to the secure server 72 is enabled (i.e., the Internet-enabled program 68 is operatively connected to the secure server 72). However, if the encrypted identifier does not match the stored identifier 38, outside access to the secure server 72 is denied (i.e., the Internet-enabled program 68 remains disconnected from the secure server 72).

Generally, the encrypted identifier from the secure server 72 is associated with a particular activation device 74, 76. If the identifiers match, this is an indication that the activation device 74, 76 in use is in fact a secondary activation device 76 that has been registered with the telematics unit 18, and that has been authorized for monitoring by a party outside of the call center 46. If the identifiers do not match, this is an indication that the activation device 74, 76 in use has not been authorized for monitoring by a party outside of the call center 46.

If outside access to the secure server 72 is denied, access to the server 72 remains limited to the call center service advisors 54.

It is to be understood that if access to the secure server 72 is enabled, such access remains open until the vehicle 12 recognizes that the secondary activation device 76 has been deactivated, or until a vehicle ignition theft event occurs. The secondary activation device 76 settings may be deactivated using a primary device 74 in the vehicle. Upon such deactivation, the telematics unit 18 informs the secure server 72 of the same. The secure server 72 then restricts any outside access (other than the call center 46) thereto.

If a vehicle ignition theft event is recognized while activation device 76 is in use or while its settings are still active, secure server 72 access will be terminated, and appropriate messaging will be transmitted to the primary user (e.g., via text or email messaging). Such a message may include the following information: "Vehicle information unavailable, possible vehicle theft event, contact call center." It is to be understood that such a message is not sent if primary activation device 74 is the last device in use, since access to the secure server 72 (and thus the vehicle information) is not available when device 74 is being used.

Once access is enabled, a user having a verified login and password is able to access the secure server 72, and any information regarding the vehicle 12 that is sent to the secure server 72 from the systems within the vehicle 12. In an embodiment, a user enters identification information (such as, for example, a predefined login and password) into the Internet-enabled program 68. Such identification information is created when the user initially sets up an account with the program 68, and is stored in the program 68 thereinafter. Upon receiving the identification information, the Internet-enabled program 68 verifies the accuracy of the information by comparing the input information with the previously stored information. If the information is verified as being accurate, the user is granted access to the account and the enabled secure server 72. If the information is verified as being inaccurate, the user is denied access to the account, and thus the secure server 72.

Once the user's account is accessed, the user may monitor the vehicle location via the Internet-enabled program that is operatively connected to the secure server 72. As previously indicated, the location data is transmitted from the location detection system 24 operatively disposed in the telematics unit 18 to the secure server 72.

While the program 68 is operatively connected to the server 72, the user may also request, via the Internet-enabled program 68, to change or set at least one of the predetermined settings for the one or more vehicle systems. The request is received at the telematics unit 18, and the change or setting is implemented accordingly.

Figure 3:
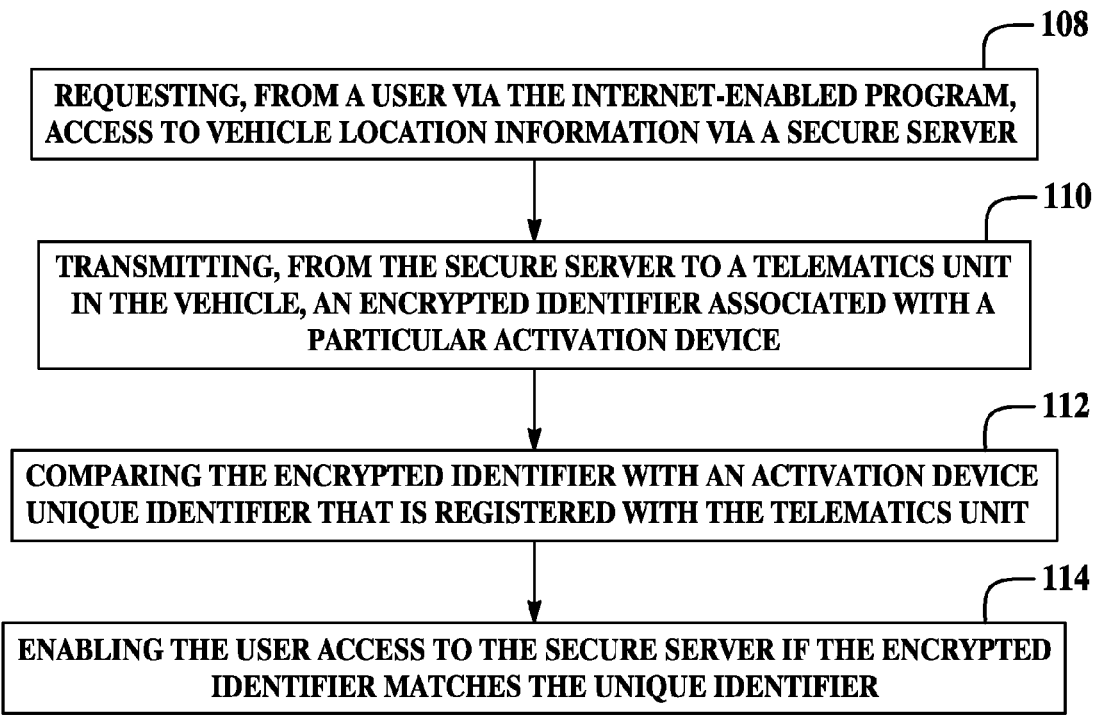
FIG. 3 is another embodiment of the method for selectively monitoring one or more vehicle systems.

Referring now to FIG. 3, still another embodiment of the method for selectively monitoring a vehicle 12 is shown. This embodiment includes requesting, from a user via the Internet-enabled program 68, access to vehicle location information via the secure server 72, as shown at reference numeral 108. The secure server 72 transmits to a telematics unit 18 in the vehicle 12, an encrypted identifier associated with a particular activation device 74, 76, as shown at reference numeral 110. The encrypted identifier is compared with an activation device 74, 76 unique identifier that is registered with the telematics unit 18, as shown at reference numeral 112. The method further includes enabling the user access to the secure server 72 if the encrypted identifier matches the unique identifier, as shown at reference numeral 114. It is to be understood that this embodiment of the method may be performed using the systems and methods previously described herein.

While several embodiments have been described in detail, it will be apparent to those skilled in the art that the disclosed embodiments may be modified. Therefore, the foregoing description is to be considered exemplary rather than limiting.

The invention claimed is:

1. A method for selectively monitoring one or more vehicle systems, the method comprising:

selecting, for an activation device, a limitation for the one or more vehicle systems, wherein the limitation is selected from a maximum vehicle speed, a maximum audio system volume, restricted radio stations, restricted audio system functions, restricted telecommunications functions, and combinations thereof;

configuring the activation device to trigger the limitation in a vehicle;

recognizing, at the vehicle, the activation device;

in response to recognizing, transmitting a signal to the one or more vehicle systems to reconfigure a setting of the one or more vehicle systems to the selected limitation;

transmitting, from a vehicle telematics unit to a secure server, a second signal that is indicative of the fact that the activation device is in use;

selectively enabling access to the secure server for monitoring the one or more vehicle systems via an Internet-enabled program in response to the second signal;

recognizing, within the vehicle, that the limitation has been exceeded; and transmitting a third signal to the Internet-enabled program, the third signal being indicative of the exceeded limitation.

2. The method as defined in claim 1 wherein prior to enabling access, the method further comprises:

transmitting, from the secure server to the telematics unit, an encrypted identifier;

comparing the encrypted identifier with a unique identifier stored in the telematics unit; and enabling access to the secure server if the encrypted identifier matches the stored identifier.

3. The method as defined in claim 2 wherein access is enabled, and wherein the method further comprises:

requesting, from a user via the Internet-enabled program, access to the enabled secure server;

verifying that identification information input by the user is accurate; and granting the user access to the enabled secure server if the identification information is accurate, or denying the user access to the enabled secure server if the identification information is not accurate.

4. The method as defined in claim 3 wherein access is granted, and wherein the method further comprises:

monitoring a vehicle location with a location detection system operatively disposed in the telematics unit;

transmitting the vehicle location to the secure server; and retrieving, via the Internet-enabled program, the location of the vehicle.

5. The method as defined in claim 3 wherein access is granted, and wherein the method further comprises:

requesting, via the Internet-enabled program, a change to the limitation for the one or more vehicle systems;

receiving the request at the telematics unit; and implementing the change to the limitation for the one or more vehicle systems.

6. The method as defined in claim 1, further comprising:

recognizing that the activation device has been disengaged; and restricting access of the secure server.

7. The method as defined in claim 6 wherein restricting access includes reconfiguring the secure server whereby access is limited to a call center service advisor.

8. The method as defined in claim 1, further comprising transmitting a notice within the vehicle that the limitation for the one or more vehicle systems has been activated.

9. The method as defined in claim 1 wherein the limitation is associated with an operating range of the one or more vehicle systems, and wherein the method further comprises:

recognizing an attempt to exceed the operation range; and transmitting a notice within the vehicle that operating the one or more vehicle systems outside the operating range is restricted.

10. A method for selectively monitoring a vehicle, the method comprising:

requesting, from a user via the Internet-enabled program, access to vehicle location information via a secure server;

transmitting, from the secure server to a telematics unit in the vehicle, an encrypted identifier associated with a particular activation device;

comparing the encrypted identifier with an activation device unique identifier that is registered with the telematics unit;

enabling the user access to the secure server when the encrypted identifier matches the unique identifier;

after access is granted, requesting, via the Internet-enabled program, a change to at least one predetermined setting for one or more vehicle systems;

receiving the request at the telematics unit; and implementing the change to the at least one predetermined setting.

11. A selective monitoring system, comprising:

a vehicle;

a limitation for one or more systems of the vehicle selected from a maximum vehicle speed, a maximum audio system volume, restricted radio stations, restricted audio system functions, restricted telecommunications functions, and combinations thereof;

an activation device recognizable by the vehicle and configured to trigger the limitation for the one or more vehicle systems;

a telematics unit operatively disposed in the vehicle;

an in-vehicle control system;

wherein the one or more vehicle systems are responsive to a signal transmitted from the in-vehicle control system to reconfigure a setting of the one or more vehicle systems to the limitation in response to the activation device and the limitation being recognized by the vehicle;

a secure server operatively connected to the telematics unit and responsive to a second signal, transmitted from the telematics unit, indicative of the fact that the activation device is in use; and storage media including an Internet-enabled program selectively operatively connected to the secure server in response to the second signal, wherein when the Internet-enabled program is operatively connected, the Internet-enabled program enables a verified user to access the secure server for monitoring the one or more vehicle systems and for receiving information that the limitation has been exceeded.

12. The selective monitoring system as defined in claim 11 wherein the secure server is configured to transmit an encrypted identifier to the telematics unit, wherein the telematics unit is configured to compare the encrypted identifier with a unique identifier stored therein, and wherein the Internet-enabled program is operatively connected to the secure server if the encrypted identifier matches the stored identifier or the Internet-enabled program is not operatively connected to the secure server if the encrypted identifier does not match the stored identifier.

13. The monitoring system as defined in claim 11 wherein the Internet-enabled program includes a database of user accounts that are accessible when identification information provided by the user is verified as being accurate.

14. The selective monitoring system as defined in claim 11 wherein the telematics unit has a vehicle detection system operatively disposed therein, and wherein when the Internet-enabled program is operatively connected to the secure server, a user may retrieve a position of the vehicle that is transmitted from the vehicle detection system.

15. The selective monitoring system as defined in claim 11 wherein the activation device is a key or a key fob.

16. The selective monitoring system as defined in claim 11, further comprising a call center service advisor in communication with the secure server.

17. The selective monitoring system as defined in claim 11, further comprising an Internet-enabled program interface in operative communication with the Internet-enabled program.

* * * * *